Sept. 1, 1931.  W. P. SCOTT  1,821,327
AUTOMOBILE TRUCK
Filed Nov. 4, 1929   3 Sheets-Sheet 1

INVENTOR.
William P. Scott.
BY Townsend, Loftus & Abbett
ATTORNEYS.

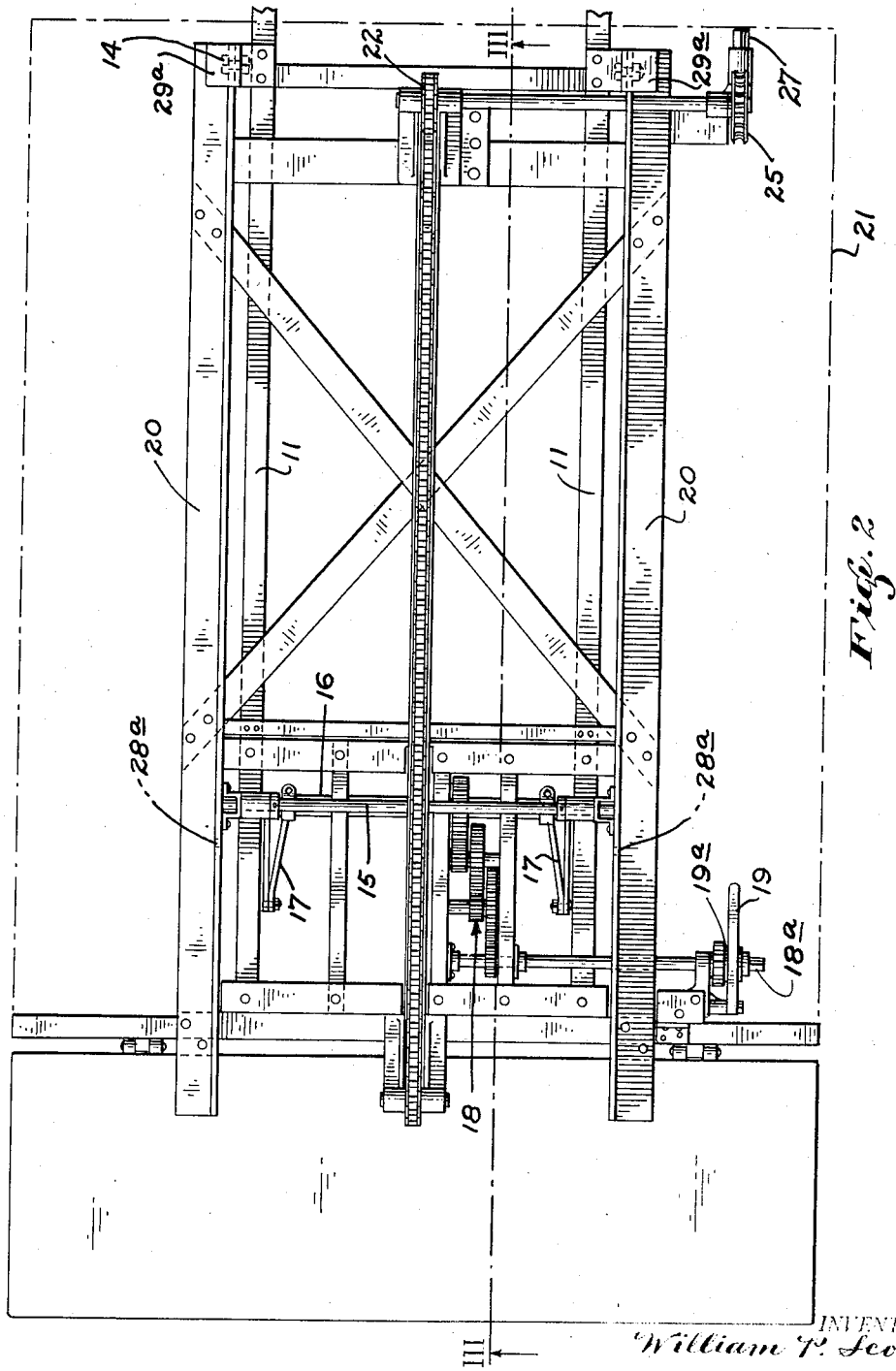

Sept. 1, 1931.   W. P. SCOTT   1,821,327
AUTOMOBILE TRUCK
Filed Nov. 4, 1929   3 Sheets-Sheet 3
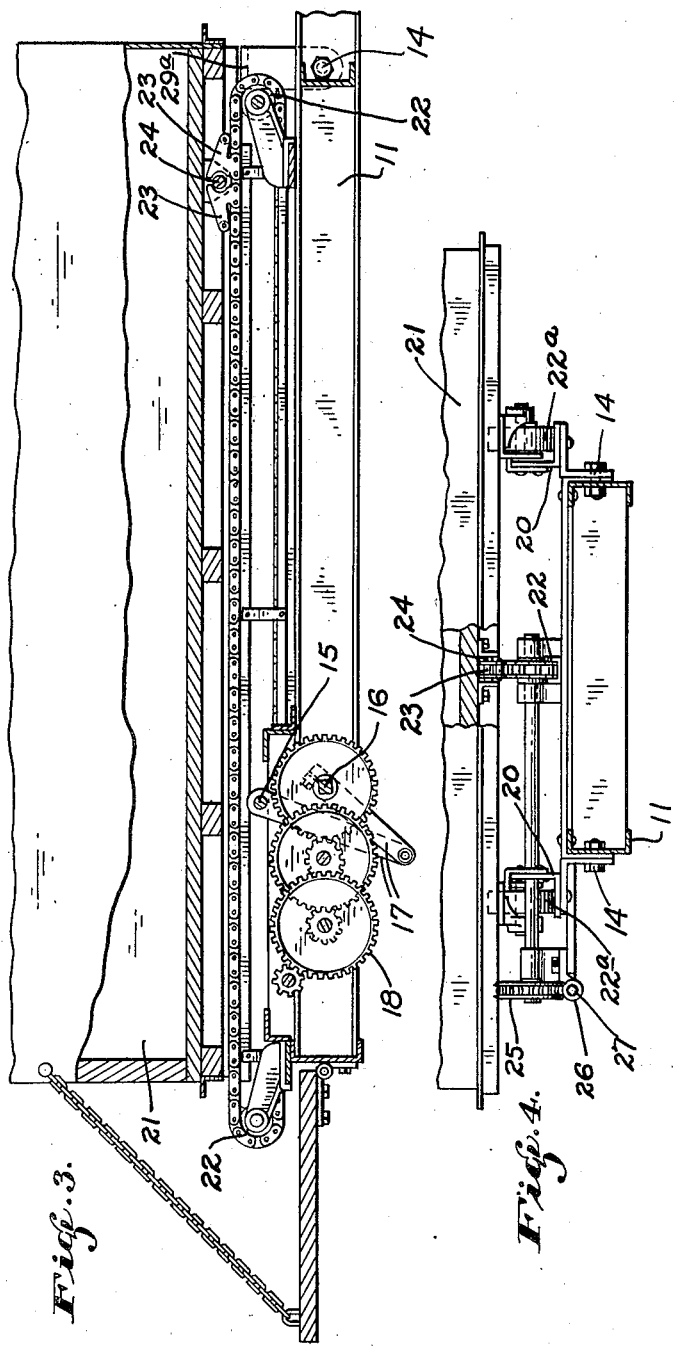
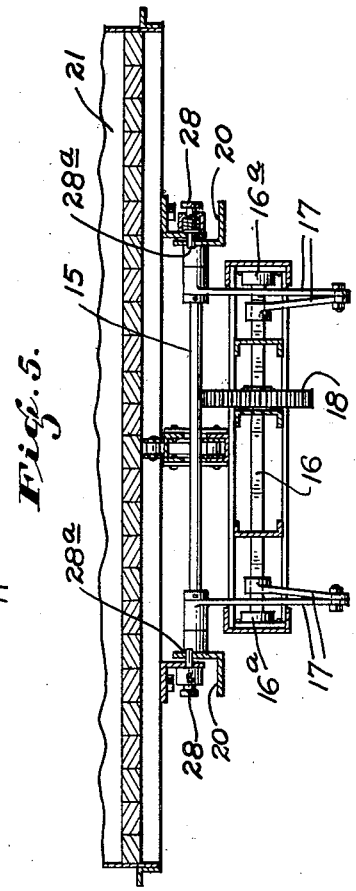
INVENTOR.
William P. Scott.
BY
Townsend, Loftus & Abbett
ATTORNEYS.

Patented Sept. 1, 1931

1,821,327

UNITED STATES PATENT OFFICE

WILLIAM P. SCOTT, OF OAKLAND, CALIFORNIA, ASSIGNOR TO DRAYAGE SERVICE CORPORATION, OF OAKLAND, CALIFORNIA, A CORPORATION OF CALIFORNIA

AUTOMOBILE TRUCK

Application filed November 4, 1929. Serial No. 404,737.

This invention relates to automotive trucks and particularly pertains to a freight transporting unit.

It is the principal object of the present invention to provide a freight transporting unit which requires but a minimum initial investment, is economical to operate, and by means of which shipments may be made from point to point.

In carrying out this object, I provide a truck chassis designed so that a freight container may be expeditiously arranged thereon or removed therefrom without the use of auxiliary equipment. This enables one chassis to accommodate any number of containers, which are comparatively inexpensive, so that the chassis need not be idle while the containers are being loaded and unloaded. Also the containers may be placed directly on a freight car from the chassis so that unit shipments may be made to various points. In accomplishing this latter, the railway car is met at its destination by another truck and the containers are transferred thereto and distributed thereby.

One form which the invention may assume is exemplified in the following description and illustrated by way of example in the accompanying drawings, in which:

Fig. 2 is a plan view of the truck chassis and hingeable subframe shown in Fig. 1.

Fig. 3 is a longitudinal section taken on the line III—III of Fig. 2.

Fig. 4 is a transverse section through the chassis taken on the line IV—IV of Fig. 1.

Fig. 5 is a similar view taken on the line V—V of Fig. 1.

Figure 1:
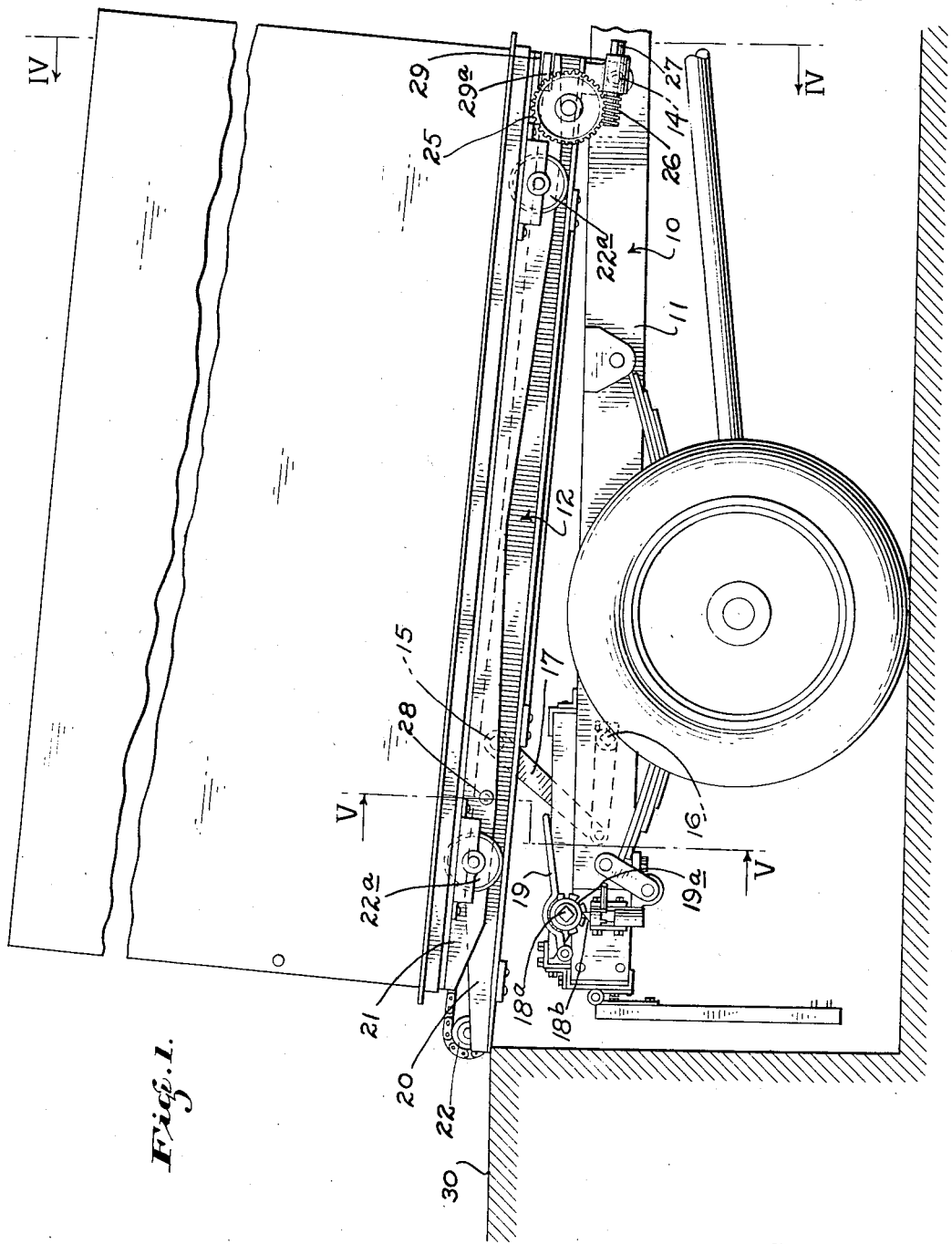
Fig. 1 is a side elevation of a truck chassis and carriage embodying the preferred form of my invention.

Referring more particularly to the accompanying drawings, 10 indicates the chassis of an automobile truck. This chassis includes longitudinal frames 11, upon which is arranged a subframe 12. This subframe 12 is pivoted to the shaft at its lower end, as at 14. Adjacent the other end of the subframe it is connected to the chassis by an elevating device, which includes a cylindrical shaft 15 extending transversely of the subframe 12, a square shaft 16 extending transversely of the frame 11 and a pair of hinged braces 17 connecting the shafts 15 and 16. The hinged braces 17 are pivotally mounted at their upper ends upon the cylindrical shaft 15 and secured to the square shaft 16 at their lower ends. The square shaft 16 has its ends journalled at 16a in the frame 11 and is adapted to be rotated by means of a gear train 18 driven by a square end shaft 18a to which a crank or other suitable means may be attached for imparting rotation thereto. A reversible and releasable ratchet pawl 18b controls the operation of the elevating device. An end brake 19 adapted to functional engagement with a drum 19a mounted on the shaft 18a affords means for lowering the subframe slowly. It is clear that the rear end of the subframe 12 may be raised by imparting rotary motion to the shaft 18a which through the gear train 18 causes the square shaft 16 to rotate. As the shaft 16 rotates, the levers 17 are urged to assume a straightened position forcing the shaft 15 attached to the subframe to move upwardly. Engagement of the pawl 18b holds the subframe in its raised position. To lower the subframe the pawl is released and the frame drops to its original position and is controlled in so dropping by the manually operated brake 19.

The subframe 12 includes a pair of parallel tracks 20, which extend longitudinally of the subframe and which project a distance beyond the rear end of the chassis frame 10. These tracks are spaced apart a distance equal to the tread of a container or carriage 21 adapted to be arranged thereon. This container or carriage 21 is fitted with wheels 22a, so that it may be driven onto or off of the tracks 20. The inner edges of the tracks 20 are flanged so as to maintain the carriage in proper alignment therewith.

I have provided means for drawing the carriage 21 onto the subframe and for removing the carriage therefrom. This means includes a pair of sprockets 22, mounted centrally of the subframe 12, and disposed one at each end thereof. An endless chain is led over these sprockets 22, which chain is fitted with a pair of oppositely disposed gripping elements 23. These gripping elements 23 are adapted to engage a transverse pin 24 on the under side of the carriage 21, so that by manipulation of the chain, the carriage 21 may be driven forwardly or rearwardly on the subframe.

To drive sprockets 22, the shaft of the front sprocket is fitted with a worm gear 25, which is in mesh with a worm 26. The shaft of this worm projects and is squared, so as to receive a crank 27. By rotating this crank 27, the worm gear 25 on the sprocket shaft will be driven, which will drive the sprocket shaft and the sprocket to move the carriage longitudinally on the subframe in either direction.

When the carriage 21 is positioned on the subframe, it may be firmly connected thereto by means of connecting devices 28. One of these devices is disposed on either side of the carriage 21 and toward the rear thereof so as to be engageable with holes 28a in the subframe. A pair of slots 29 in the forward end of the carriage 21 engage two clips 29a on the subframe 12 as the carriage is rolled into place. The carriage and subframe are thus secured against relative movement while the truck is enroute.

In operation of the device, the carriage or container 21 is arranged upon a standard freight platform such as illustrated by the numeral 30. The subframe 12 is then elevated so that the end of the tracks 20 will be above the platform. The truck chassis is then backed against the platform as illustrated in Fig. 1 and the subframe is lowered until the ends of the tracks 20 bear on the top of the platform. The carriage 21 is then rolled onto the subframe with its wheels on the tracks 20. The crank 27 may then be placed in operation so that the grippers 23 on the chain may engage the transverse pin 24 on the carriage to draw the same onto the subframe along the tracks 20.

In Fig. 1 the subframe is shown as slightly inclined, so that the carriage 21 will freely roll therealong to proper position. After the carriage has been properly positioned on the subframe 12, the connecting devices 28 are inserted to tightly connect the carriage to the subframe. The automotive truck is then moved forwardly to disengage the tracks 20 from the platform and thereafter the subframe is lowered until it bears upon the chassis frame in the manner hereinbefore described.

When it is desired to remove the container or carriage 21 from the chassis, the subframe is elevated relative to the chassis frame until the tracks 20 are at a greater elevation than the platform. The truck is then backed to the platform and the subframe is lowered until the tracks 20 bear on the platform. The connecting devices 28 are then disengaged and the crank 27 is revolved to operate the chain which is led over the sprockets 22. The gripper devices engage the transverse pin 24 on the carriage 21 and move the carriage rearwardly until it is removed from the tracks 20.

It is obvious that by means of the present invention any number of separate carriages or containers may be used in connection with a single chassis, thus enabling the chassis to be in operation while the different carriages or containers are being loaded or unloaded.

It is also evident that the carriages 21 will be comparatively inexpensive to construct, making the initial investment of the entire unit a minimum. It is also apparent from the foregoing that special equipment need not be provided at different points for loading or unloading the carriages 21 from the chassis; thus a unit constructed in accordance with the present invention may be operated at any point where a standard freight platform is constructed.

The present invention can also be utilized in connection with unit shipments. That is, the chassis may be of sufficient length so that more than one container or carriage may be positioned thereon at one time so that a unit shipment may be stored in each carriage for one destination. These carriages 21 may then be transported to a railway or other conveyor, such as a truck or semi-trailer capable of carrying a number of carriages between termini, and then delivered to a central point. At this latter point the carriages will be unloaded from the railway car onto a truck and the individual carriages distributed at their destination by truck.

While I have shown the preferred form of my invention, it is to be understood that various changes may be made therein by those skilled in the art, without departing from the spirit of the invention, as defined in the appended claims.

Having thus described my invention, what I claim and desire to secure by Letters Patent is:

1. In combination with a truck frame, a sub-frame overlying the same, a pivotal connection between the forward end of said sub-frame and said truck frame whereby the rearmost end of the sub-frame may be raised and lowered, said sub-frame having tracks extending longitudinally thereof, a wheeled carriage adapted to be moved longitudinally of said tracks, transverse axles on said carriage carrying wheels adapted to roll on the sub-frame tracks, a pair of transverse shafts carried by the sub-frame and arranged one at each end thereof, a sprocket on each shaft arranged centrally of the sub-frame, an endless chain carried by said sprockets, means on said chain for engaging an axle of the carriage whereby movement of the chain will impart movement to the carriage.

2. In combination with a truck frame, a sub-frame overlying the same, a pivotal connection between the forward end of said sub-frame and said truck frame whereby the rearmost end of the sub-frame may be raised and lowered, said sub-frame having tracks extending longitudinally thereof, a wheeled carriage adapted to be moved longitudinally of said tracks, transverse axles on said carriage carrying wheels adapted to roll on the sub-frame tracks, a pair of transverse shafts carried by the sub-frame and arranged one at each end thereof, a sprocket on each shaft arranged centrally of the sub-frame, an endless chain carried by said sprockets, means on said chain for engaging an axle of the carriage whereby movement of the chain will impart movement to the carriage, a worm wheel secured to the forwardmost of said shafts at the side of the sub-frame, a worm carried by the sub-frame and engageable with said worm wheel, and means for revolving said worm to revolve the worm wheel and thereby operate said chain.

WILLIAM P. SCOTT.